(12) United States Patent
Bertran et al.

(10) Patent No.: US 12,455,632 B2
(45) Date of Patent: Oct. 28, 2025

(54) WEARABLE DEVICE HAVING GESTURES FOR PROXIMATE POINTS OF INTEREST

(71) Applicant: Google LLC, Mountain View, CA (US)

(72) Inventors: Ishac Bertran, Brooklyn, NY (US); Jochen Weber, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/428,632

(22) Filed: Jan. 31, 2024

(65) Prior Publication Data

US 2025/0244831 A1    Jul. 31, 2025

(51) Int. Cl.
    *G06F 3/01*      (2006.01)
    *G06F 3/0346*    (2013.01)
    *G06F 16/29*     (2019.01)

(52) U.S. Cl.
    CPC .............. *G06F 3/017* (2013.01); *G06F 3/016* (2013.01); *G06F 3/0346* (2013.01); *G06F 16/29* (2019.01)

(58) Field of Classification Search
    CPC ...................................... G06F 3/017
    USPC ......................................... 345/156
    See application file for complete search history.

(56) References Cited

U.S. PATENT DOCUMENTS

| | | | |
|---|---|---|---|
| 9,129,009 B2 | 9/2015 | Li et al. | |
| 9,189,556 B2 | 11/2015 | Mitchell et al. | |
| 10,394,841 B2 | 8/2019 | Denman et al. | |
| 11,176,627 B1* | 11/2021 | Catalano | ................ G06V 20/39 |
| 2009/0319175 A1* | 12/2009 | Khosravy | .......... G01C 21/3679 |
| | | | 715/863 |
| 2010/0293173 A1 | 11/2010 | Chapin et al. | |
| 2015/0355468 A1 | 12/2015 | Osterhout et al. | |

(Continued)

FOREIGN PATENT DOCUMENTS

| | | |
|---|---|---|
| JP | 2017223666 | 12/2017 |
| WO | WO2023059699 | 4/2023 |

OTHER PUBLICATIONS www.igismap.com, "Formula to Find Bearing or Heading angle between two points: Latitude Longitude", 2015, https://www.igismap.com/formula-to-find-bearing-or-heading-angle-between-two-points-latitude-longitude/, Retrieved on Jan. 31, 2024, 13 pages.

(Continued)

*Primary Examiner* — Long D Pham
(74) *Attorney, Agent, or Firm* — DORITY & MANNING P.A.

(57) ABSTRACT

Computing systems and computer-implemented methods are provided. In one aspect, the computer-implemented method includes detecting, by a computing system comprising one or more computing devices, a user gesture from a user of the computing system. The computer-implemented method includes, responsive to detecting the user gesture, obtaining, by the computing system, data associated with one or more points of interest (POIs) proximate to a physical location of the user. The computer-implemented method includes determining, by the computing system, the user gesture is directed to a particular POI of the one or more POIs. The computer-implemented method includes providing, by the computing system, data associated with the particular POI for display to the user.

13 Claims, 9 Drawing Sheets

(56) References Cited

U.S. PATENT DOCUMENTS

2015/0362988 A1    12/2015   Yamamoto et al.
2023/0073886 A1     3/2023   Venkatakrishnan et al.

OTHER PUBLICATIONS economictimes.indiatimes.com, "Apple Watch Series 8 to Sport Built-In Camera, to be Hidden in Digital Crown", Jun. 1, 2022, https://economictimes.indiatimes.com/magazines/panache/apple-watch-series-8-to-sport-built-in-camera-to-be-hidden-in-digital-crown/articleshow/91942208.cms, Retrieved on Jan. 31, 2024, 2 pages.
International Search Report and Written Opinion for Application No. PCT/US2025/013696, mailed May 8, 2025, 18 pages.

* cited by examiner

WEARABLE DEVICE HAVING GESTURES FOR PROXIMATE POINTS OF INTEREST

FIELD

The present disclosure relates generally to computing systems and methods for identifying particular points of interest (POIs) in an environment surrounding a user.

BACKGROUND

A wearable computing device may be worn, for instance, on a user's wrist. The wearable computing device may include a plurality of sensors such as, e.g., accelerometer(s), gyroscope(s), biometric sensor(s), global positioning system(s) (GPS(s)), and the like. Some wearable computing devices (e.g., wrist watches or fitness devices) may gather data regarding activities performed by the user, or regarding the user's physiological state, via the plurality of sensors. Such data may include data representative of the environment around the user or the user's interaction with the environment. For example, the data can include motion data regarding the user's movements and/or the user's location. It could be useful to utilize such data to provide the user with information about the user's surroundings.

SUMMARY

Aspects and advantages of embodiments of the present disclosure will be set forth in part in the following description, or can be learned from the description, or can be learned through practice of the embodiments.

In one aspect, a computer-implemented method is provided. The method includes detecting, by a computing system comprising one or more computing devices, a user gesture from a user of the computing system. The method further includes, responsive to detecting the user gesture, obtaining, by the computing system, data associated with one or more points of interest (POIs) proximate to a physical location of the user. The method further includes determining, by the computing system, the user gesture is directed to a particular POI of the one or more POIs. The method further includes providing, by the computing system, data associated with the particular POI for display to the user.

In another aspect, a computing system is provided. The computing system includes one or more computing devices having one or more processors. The computing system further includes one or more non-transitory computer readable media that collectively store instructions that, when executed by the one or more processors, cause the computing system to perform operations. The operations include detecting a user gesture from a user of the computing system. The operations further include, responsive to detecting the user gesture, obtaining data associated with one or more points of interest (POIs) proximate to a physical location of the user. The operations further include determining the user gesture is directed to a particular POI of the one or more POIs. The operations further include providing data associated with the particular POI for display to the user.

In another aspect, a computing device is provided. The computing device includes a display and an inertial measurement unit (IMU). The computing device further includes one or more processors configured to: detect a user gesture from a user of the computing device; obtain data associated with one or more points of interest (POIs) proximate to a physical location of the user; determine the user gesture is directed to a particular POI of the one or more POIs; and cause the display to display data associated with the particular POI.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

Figure 1A:
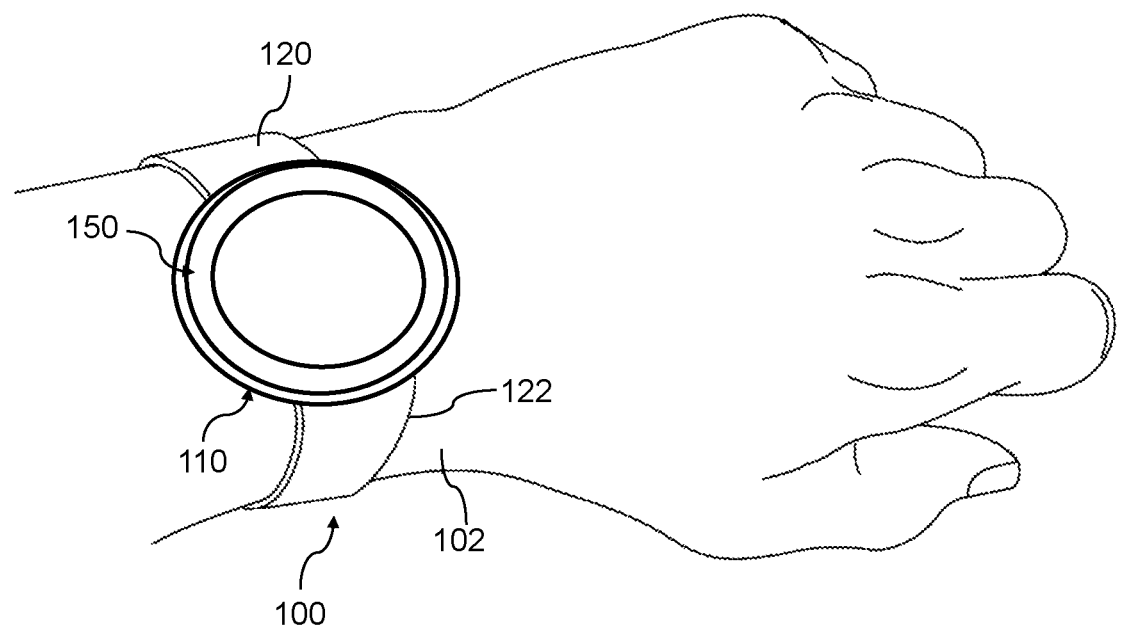
FIG. 1A depicts a wearable computing device according to example embodiments of the present disclosure.

Repeat use of reference characters in the present specification and drawings is intended to represent the same and/or analogous features or elements of the present invention.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations may be made to the embodiments without departing from the scope or spirit of the present disclosure. For instance, features illustrated or described as part of one embodiment may be used with another embodiment to yield a still further embodiment. Thus, it is intended that aspects of the present disclosure cover such modifications and variations.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (e.g., "A or B" is intended to mean "A or B or both"). The term "at least one of" in the context of, e.g., "at least one of A, B, and C" refers to only A, only B, only C, or any combination of A, B, and C. In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" do not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Example aspects of the present disclosure relate to computing systems and methods for identifying particular points of interest (POIs) in an environment surrounding a user. In particular, a computing system according to the present disclosure may include one or more computing devices having a display, such as a wearable computing device (e.g., smartwatch, augmented reality glasses/goggles, etc.) and/or a mobile computing device (e.g., smartphone, tablet, etc.).

Mapping applications and online databases allow users to search for and retrieve information associated with their surroundings. For instance, users may obtain, e.g., restaurant information, public transportation schedules, business ratings, etc. associated with various points of interest (POIs) in their surroundings from such applications and databases. However, in order to retrieve such information while on the go, users must first pull out and unlock their mobile computing device (e.g., smartphone, tablet, etc.), open the appropriate application, and type a correct description or search term(s) in order to search for a particular POI for which additional information is sought. As such, there is a gap between a user seeing the particular POI and the user retrieving additional information about the particular POI.

Accordingly, example aspects of the present disclosure provide computing systems and methods for identifying particular POIs in an environment surrounding a user and obtaining data associated with the particular POIs based on user gestures. The computing system may include one or more computing devices having a display. The one or more computing devices may further include one or more sensors, such as an inertial measurement unit (IMU), configured to detect one or more gestures made by a user of the one or more computing devices. For instance, a wearable computing device according to the present disclosure may include an IMU configured to detect (and differentiate between) a variety of user gestures, such as a pointing gesture and a gesture indicative of the user raising their wrist to check the time. It should be understood that example aspects of the present disclosure are discussed with reference to a wearable computing device for purposes of illustration and discussion, and those having ordinary skill in the art, using the disclosures provided herein, will understand that example aspects of the present disclosure may be implemented with any suitable computing device without deviating from the scope of the present disclosure.

As will be discussed in greater detail below, example aspects of the present disclosure provide a user the ability to obtain information about POIs in their surrounding environment by simply pointing to a particular POI. More particularly, a computing system according to the present disclosure may be operable to detect a user gesture from a user of the computing system. Responsive to detecting the user gesture, the computing system may then obtain data associated with one or more POIs proximate to a physical location of the user. Subsequently, the computing system may determine that the user gesture is directed to a particular POI of the one or more POIs proximate to the physical location of the user. Then, after identifying the particular POI at which the user gesture is directed, the computing system may provide data associated with that particular POI for display to the user via the display.

As noted above, the computing system may be operable to differentiate between a variety of user gestures. In particular, to detect the user gesture from the user, the computing system may process sensor data generated by the IMU and, based on the sensor data, may subsequently determine that the user gesture is a pointing gesture. For instance, in some embodiments, the IMU may be a steady IMU having one or more accelerometers, one or more gyroscopes, etc. In this manner, based on the sensor data generated by the IMU, the computing system is able to differentiate between a variety of different user gestures.

Responsive to detecting the user gesture (e.g., a pointing gesture), the computing system may then determine the physical location of the user and retrieve data associated with one or more POIs in a geographic area proximate to the physical location of the user. For instance, in some embodiments, the computing system may include a navigation positioning system (e.g., global positioning system (GPS)) operable to generate user location data. The computing system may then determine geographic coordinates corresponding to the physical location of the user based on the user location data generated by the GPS. Then, using the geographic coordinates of the user as a virtual reference point, the computing system may determine a pointing direction vector corresponding to a direction of the pointing gesture by the user. The computing system may also determine a search radius and a search angle in the geographic area, which together define a search area within the geographic area proximate to the physical location of the user. Then, the computing system may identify the one or more POIs within the search area and may subsequently retrieve data associated with the one or more POIs.

In some examples, the computing system may provide a haptic notification to the user via a haptic device of a computing device of the computing system after determining the physical location of the user and/or determining the pointing direction vector of the user gesture. More particularly, in some examples, the computing system may provide the haptic notification to alert the user that computing system has obtained enough information to identify the particular POI at which the user gesture was directed. Hence, in some examples, the haptic notification may indicate to the user that the display information associated with the particular POI will soon be surfaced to a display of the computing system for viewing by the user.

To determine which of the one or more POIs the user gesture is directed, the computing system may determine a normalized bearing relative to the pointing direction vector for each of the POIs within the search area. The computing system may also determine how far the user is from each of the one or more POIs. Based on the normalized bearing and the determined distance, the computing system may determine that the user gesture is directed to a particular POI within the search area. For instance, in some embodiments, the computing system may determine the particular POI based on the POI having the smallest normalized bearing relative to the pointing direction vector. Additionally and/or alternatively, in some embodiments, the computing system may determine the particular POI based on the POI having the shortest walking distance from the physical location of the user. Moreover, the computing system may determine the particular POI based on individual user preferences of the user and/or based on a prior search history of the user.

Once the particular POI at which the user gesture is directed has been identified, the computing system may provide a haptic notification to the user via the haptic device of a computing device of the one or more computing devices. As will be discussed in greater detail below, the haptic notification may indicate to the user that the computing system has successfully identified the particular POI. Additionally and/or alternatively, the haptic notification provided after the particular POI has been identified may be a second haptic notification. For instance, in some examples, a haptic notification may also be provided prior to the particular POI being identified. In such examples, as noted above, the first haptic notification may indicate to the user that the computing system has obtained enough information to identify the particular POI. In this manner, the computing system may provide a haptic notification to indicate to the user that display information will soon be surfaced to a display for viewing by the user and/or that the display information is ready for viewing by the user.

The computing system may then generate display information for presentation to the user that corresponds to the data associated with the particular POI. The display information may be surfaced to the user via the display, thereby causing the computing device to present the display information to the user. In this manner, the present disclosure provides a computing system and method that allows a user to simply point at a POI and, subsequently, receive information associated with the POI from the computing system.

Example aspects of the present disclosure provide numerous technical effects and benefits. For instance, example aspects of the present disclosure provide systems and methods for efficiently and effectively providing contextual information about a user's surroundings. As such, the disclosed systems and methods may significantly reduce the time/effort needed to obtain and provide the user with the contextual information, as well as significantly reduce the costs associated therewith. Furthermore, by leveraging pre-existing data associated with mapping applications and databases, the present disclosure provides resulting improvements to computing technology tasked with generating and storing POI-related data by improving the speed and accuracy of POI identification, thereby improving the operational speeds of the computing system. In this way, the present disclosure may obviate the need for additional storage space and/or additional sensors in computing devices in the computing system which, in turn, saves device storage space and processor usage.

For instance, by differentiating between user gestures, the need to continuously track the user's location is eliminated which, in turn, improves processor usage for the one or more computing devices. Furthermore, by identifying a specific area to be searched following the user gesture, the one or more computing devices do not need to store unrelated POI information, thereby improving and saving storage space within the one or more computing devices. In this way, valuable computing resources within a computing system that would have otherwise been needed for such tasks can be reserved for other tasks. Hence, the reduced processing and storage requirements ultimately result in more efficient resource allocation/use for the computing system.

Figure 1B:
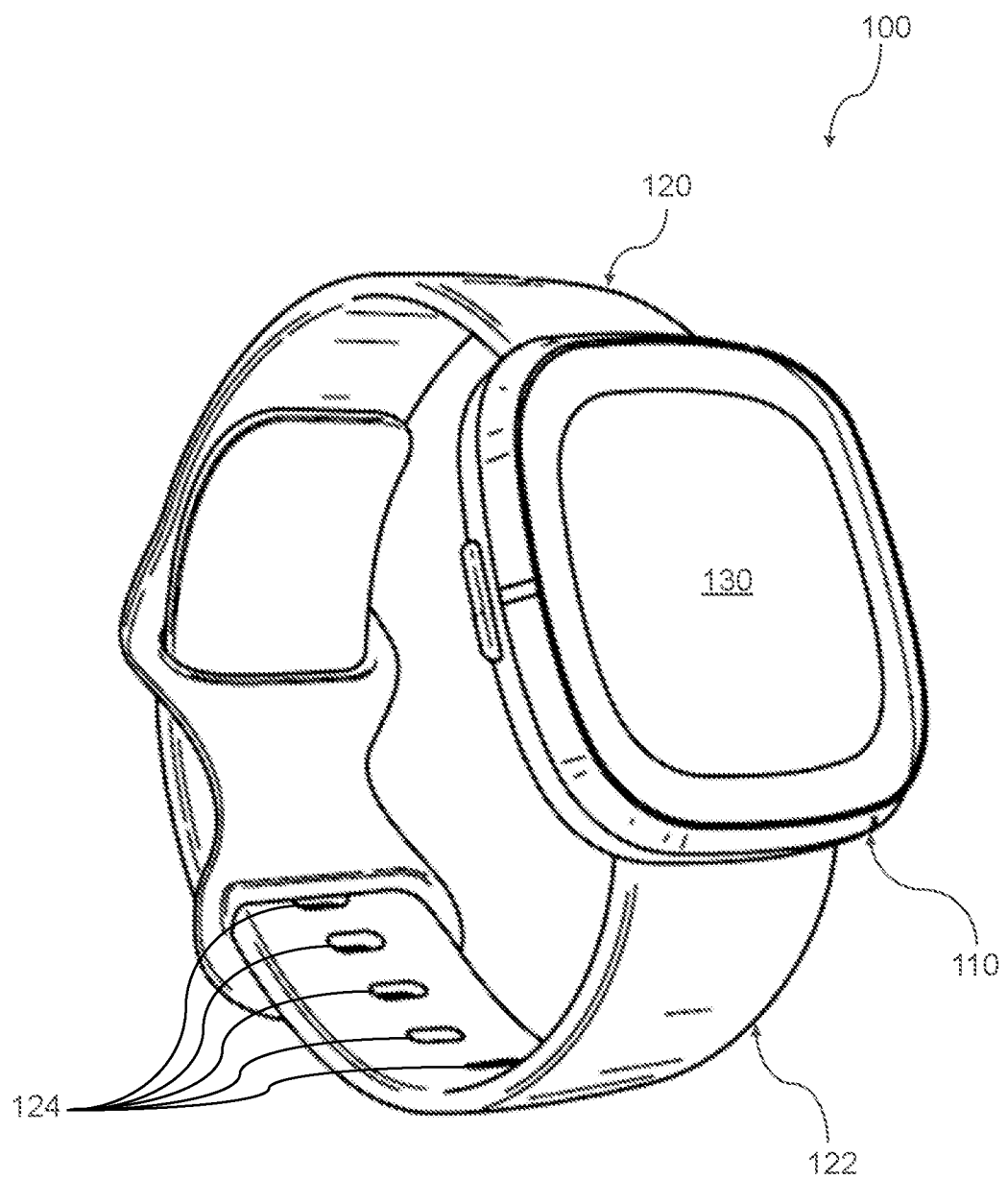
FIG. 1B depicts a front perspective view of a wearable computing device according to example embodiments of the present disclosure.
Figure 1C:
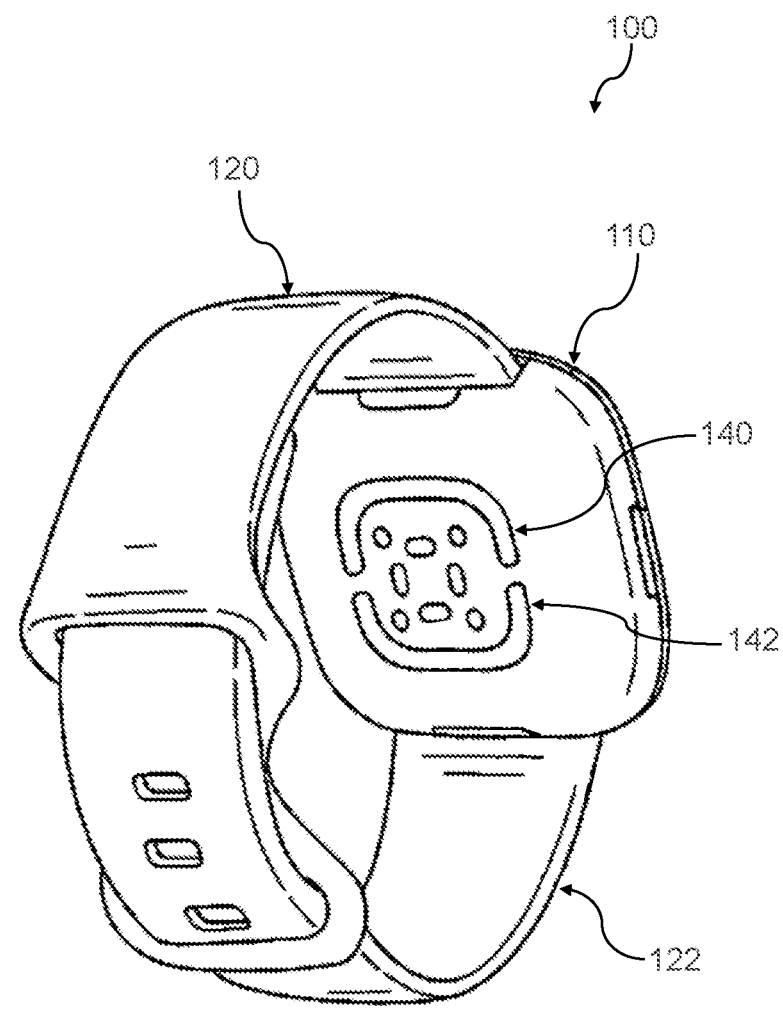
FIG. 1C depicts a rear perspective view of the wearable computing device of FIG. 1B according to example embodiments of the present disclosure.

Referring now to FIGS. 1A-1C, an example wearable computing device 100 according to some implementations of the present disclosure is depicted. It should be understood that example aspects of the present disclosure are discussed with reference to a wearable computing device 100 for purposes of illustration and discussion, and those having ordinary skill in the art, using the disclosures provided herein, will understand that example aspects of the present disclosure may be implemented with any suitable computing device of the computing system without deviating from the scope of the present disclosure.

As shown, the wearable computing device 100 can be worn on a distal location of a user 102, such as, an arm (e.g., wrist) of the user 102. The wearable computing device 100 can include a housing 110. The housing 110 can include a base plate 112 coupled to the housing 110. In this manner, the base plate 112 can define a bottom surface of the housing 110. The housing 110 can define a cavity (e.g., internal volume) (not shown) in which one or more electronic components (e.g., disposed on printed circuit boards) are disposed. For instance, the wearable computing device 100 can include a printed circuit board (e.g., flexible printed circuit board) (not shown) disposed within the cavity. Furthermore, one or more electronic components can be disposed on the printed circuit board. The wearable computing device 100 can further include a battery (not shown) that is disposed within the cavity defined by the housing.

As shown, the wearable computing device 100 can include a first band 120 coupled to the housing 110 at a first location and a second band 122 coupled to the housing 110 at a second location. The first band 120 and the second band 122 can be coupled to one another at a third location (not shown) to secure the housing 110 to the arm of the user 102. For instance, the first band 120 can include a buckle or clasp (not shown). Additionally, the second band 122 can define a plurality of apertures 124 spaced apart from one another along a length of the second band 122. In such embodiments, a prong of the buckle associated with the first band 120 can extend through one of the plurality of openings defined by the second band 122 to couple the first band 120 to the second band 122.

It should be appreciated that the first band 120 can be coupled to the second band 122 using any suitable type of fastener. For instance, in some embodiments, the first band 120 and the second band 122 can include a magnet (not shown). In such embodiments, the first band 120 and the second band 122 can be magnetically coupled to one another to secure the housing 110 to the arm of the user 102.

The wearable computing device 100 can include a display 130 configured to display content (e.g., time, date, biometric, notifications, etc.) for viewing by the user 102. The display 130 can include a plurality of pixels. For instance, in some embodiments, the display 130 can include an organic light-emitting diode (OLED) display. It should be understood, however, that the display 130 can include any suitable type of display.

In some implementations, the wearable computing device 100 can include a first electrode 140 and a second electrode 142. It should be understood that the wearable computing device 100 can include more or fewer electrodes. As shown, the first electrode 140 and the second electrode 142 are positioned with respective apertures (e.g., cutouts) defined by the housing 110. Furthermore, the first electrode 140 and the second electrode 142 can each contact (e.g., touch) the wrist of the user 102. In this manner, the first electrode 140 and the second electrode 142 can be used to measure one or more biometrics (e.g., electrodermal activity, electrocardiogram, body impedance, skin temperature) of the user 102.

The wearable computing device 100 can include a display cover 150 positioned on the housing 110 such that the display cover 150 is positioned on top of the display 130. In this manner, the display cover 150 can protect the display 130 from being damaged (e.g., scratched or cracked). In some embodiments, the wearable computing device 100 can include a seal (not shown) positioned between the housing 110 and the display cover 150. For instance, a first surface of the seal can contact the housing 110 and a second surface of the seal can contact the display cover 150. In this manner, the seal between the housing 110 and the display cover 150 can prevent a liquid (e.g., water) from entering the cavity defined by the housing 110.

It should be understood that the display cover 150 can be optically transparent so that the user 102 can view information being displayed on the display 130. For instance, in some embodiments, the display cover 150 can include a glass material. It should be understood, however, that the display cover 150 can include any suitable optically transparent material.

Figure 2:
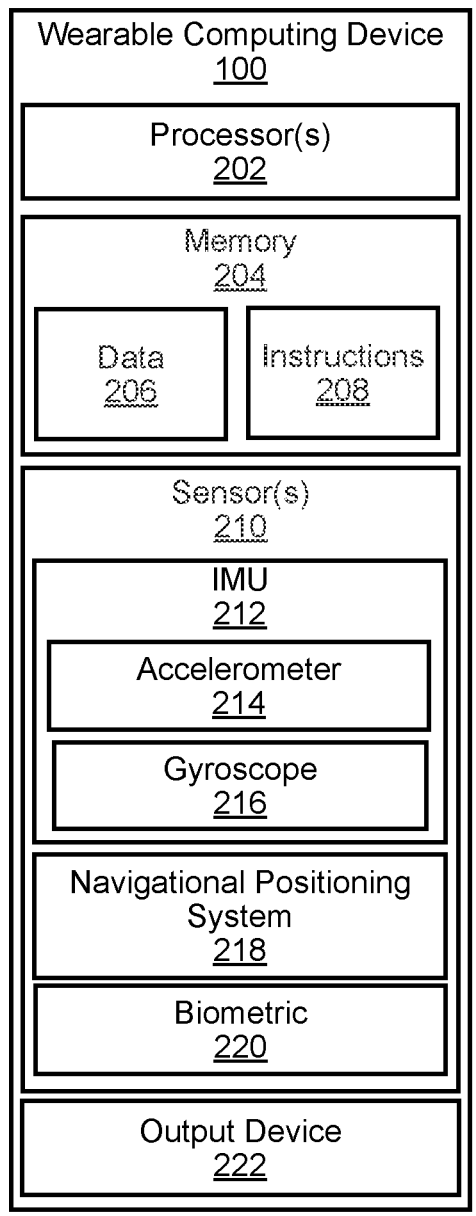
FIG. 2 depicts a block diagram of components of a wearable computing device according to example embodiments of the present disclosure.

Referring now to FIG. 2, a block diagram of components of a wearable computing device 100 is provided according to some embodiments of the present disclosure. It should be understood that the wearable computing device 100 can be implemented within the computing system 700 discussed below with reference to FIG. 7.

As shown, the wearable computing device 100 can include one or more processors 202. The one or more processors 202 can include any suitable processing device (e.g., a processor core, a microprocessor, an application specific integrated circuit (AISC), a field programmable gate array (FPGA), a microcontroller, etc.). The wearable computing device 100 can further include a memory 204. The memory 204 can include one or more non-transitory computer-readable storage media, such as random access memory (RAM), read-only memory (ROM), electronically erasable programmable ready-only memory (EEPROM), erasable programmable read-only memory (EPROM), flash memory devices, and combinations thereof. The memory 204 can store data 206 and instructions 208 that, when executed by the one or more processors 202, cause the one or more processors 202 to perform operations disclosed herein.

The wearable computing device 100 can include a plurality of sensors 210. For instance, in some embodiments, the plurality of sensors 210 may include an inertial measurement unit (IMU) 212, such as a steady IMU. In some examples, the IMU 212 may include one or more sensors, such as one or more accelerometers 214 (e.g., multi-axis accelerometer), one or more gyroscopes 216, and the like. In this manner, the IMU 212 may obtain motion data (e.g., acceleration, angular velocity, etc.) indicative of movement of the user.

The plurality of sensors 210 may further include sensors and/or devices operable to determine a position and/or location of the user, such as, for instance, a navigational positioning system 218. In some examples, the navigational positioning system 218 may include a global positioning system (GPS) (not shown), a compass (not shown), and the like. The navigational positioning system 218 may be operable to generate location data corresponding to a physical location of the user.

In some embodiments, the plurality of sensors 210 can include one or more biometric sensors 220. For instance, the one or more biometric sensors 220 may be positioned on the bottom surface of the housing 110 (FIGS. 1A-1C) of the wearable computing device 100. In this manner, the one or more biometric sensors 220 can obtain biometric data of the user wearing the wearable computing device 100. Furthermore, in some embodiments, the one or more biometric sensors 220 can include a photoplethysmogram (PPG) sensor. Additionally and/or alternatively, in some embodiments, the one or more biometric sensors 220 can include a temperature sensor configured to detect temperature data associated with the user wearing the wearable computing device 100, such as a body temperature of the user and/or a skin temperature of the user. For instance, in some embodiments, the one or more biometric sensors 220 may include one or more temperature sensors operable to obtain body temperature data, such as, e.g., skin temperature data indicative of a skin temperature of the user, tissue temperature data indicative of a temperature of subcutaneous tissue of the user, muscle temperature data indicative of a temperature of muscle tissue of the user, and core temperature data indicative of a core temperature of the user. Additionally and/or alternatively, in some embodiments, the one or more biometric sensors 220 can include an impedance sensor configured to measure a body impedance of the user wearing the wearable computing device 100. It should be understood that the one or more biometric sensors 220 can include any suitable biometric sensor configured to obtain biometric data of the user wearing the wearable computing device 100 without deviating from the scope of the present disclosure.

In some embodiments, the wearable computing device 100 can include one or more output devices 222. For instance, the one or more output devices 222 can include a display screen (e.g., display 130). In this manner, the wearable computing device 100 can display content (e.g., notifications) that can be viewed by the user. Alternatively, or additionally, the one or more output devices 222 can include one or more speakers. In this manner, the wearable computing device 100 can emit audible noises (e.g., alarm, voice automated message, etc.) for the user. Additionally and/or alternatively, in some examples, the one or more output devices 222 may include one or more haptic devices operable to generate haptic notifications, such as vibratory notifications and the like.

In some embodiments, the one or more processors 202 can be communicatively coupled to the plurality of sensors 210. For instance, the one or more processors 202 can be communicatively coupled to the plurality of sensors 210 via a data interface (e.g., data bus). In this manner, the one or more processors 202 may obtain data from the plurality of sensors 210. In some examples, the one or more processors 202 may detect a user gesture from a user of the wearable computing device 100 based on sensor data received from the plurality of sensors 210, such as the IMU 212. The one or more processors 202 may also differentiate between a variety of different user gestures (e.g., raising arm to check time, pointing, rotating, etc.) based on the sensor data received from the plurality of sensors 210. As will be discussed in greater detail below, the one or more processors 202 may determine that the detected user gesture is directed to a particular point of interest (POI) in an environment surrounding the user and, in response, may provide data associated with the particular POI to the user via the one or more output devices 222.

In some embodiments, biometric data obtained from the one or more biometric sensors 220 of the wearable computing device 100 can indicate whether the wearable computing device 100 is currently being worn by the user. For instance, in some embodiments, the biometric data obtained from the one or more biometric sensors 220 can indicate the wearable computing device 100 is not being worn (e.g., off-wrist) by the user. In such embodiments, the one or more processors 202 can be configured to disable impedance data collection functionality while the biometric data obtained from the one or more biometric sensors 220 indicates the wearable computing device 100 is not being worn by the user. In this manner, erroneous data from the one or more biometric sensors 220 can be ignored. It should be understood that the one or more processors 202 can be configured to enable impedance data collection functionality when the biometric data obtained from the one or more biometric sensors 220 indicates the wearable computing device 100 is being worn (e.g., on-wrist) by the user.

Example aspects of the present disclosure are directed to a computing system (FIG. 7) that includes one or more computing devices, such as the wearable computing device 100. As discussed herein, the computing system may be operable to identify particular POIs in an environment surrounding a user and obtaining data associated with the particular POIs based on user gestures. More particularly, as will now be discussed, the computing system may detect a user gesture, obtain data associated with one or more POIs proximate to a physical location of the user, determine that the user gesture is directed to a particular POI of the one or more POIs proximate to the physical location of the user, and then provide data associated with the particular POI for display to the user.

Figure 3:
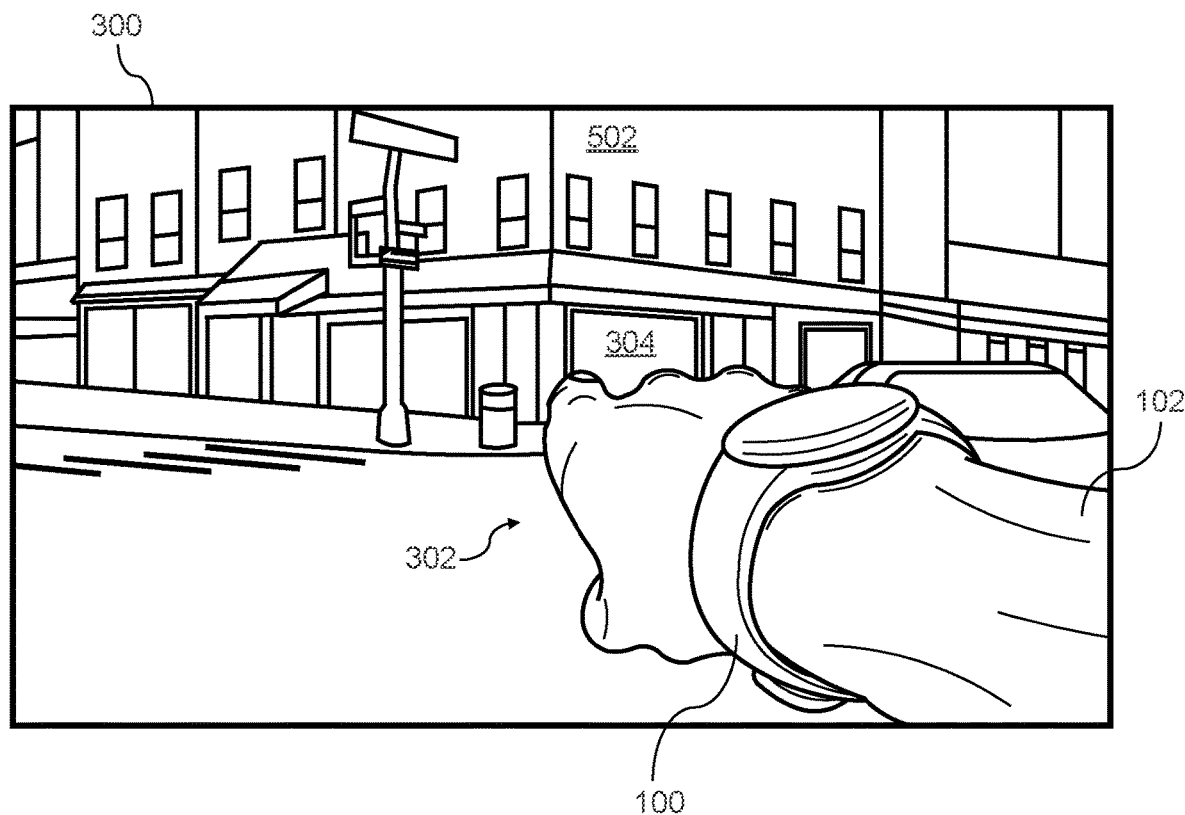
FIG. 3 depicts an example user gesture according to example embodiments of the present disclosure.

As an illustrative example, referring now to FIG. 3, an example user gesture is depicted according to example embodiments of the present disclosure. It should be understood that example aspects of the present disclosure are discussed with reference to a wearable computing device 100 for purposes of illustration and discussion, and those having ordinary skill in the art, using the disclosures provided herein, will understand that example aspects of the present disclosure may be implemented with any suitable computing device of the computing system without deviating from the scope of the present disclosure.

As noted above, example aspects of the present disclosure provide a user of the computing system the ability to obtain information about POIs in their surrounding environment by simply pointing to a particular POI. More particularly, a computing system (e.g., computing system 700 (FIG. 7)) may include one or more computing devices, such as the wearable computing device 100. A user 102 wearing the wearable computing device 100 may perform a variety of user gestures, and the sensor(s) 210 (FIG. 2) therein (e.g., IMU 212 (FIG. 2)) may be operable to detect and differentiate between the variety of gestures. More particularly, as shown, the user 102 may perform a pointing gesture 302 directed to a particular point of interest (POI) 304 in an environment 300 surrounding the user 102. When the user 102 performs the pointing gesture 302, one or more sensors in the wearable computing device 100 generate sensor data that may be used to differentiate the pointing gesture 302 from other user gestures, such as a gesture indicative of the user 102 raising their wrist to check the time. For instance, in some examples, the IMU 212 (FIG. 2) may generate sensor data in response to the user 102 performing the pointing gesture 302. A processor (e.g., processor(s) 202 (FIG. 2) may process the sensor data generated by the IMU 212 (FIG. 2) and may determine, based on the sensor data, that the user 102 is performing the pointing gesture 302 (as opposed to other, non-pointing gestures).

Figure 4:
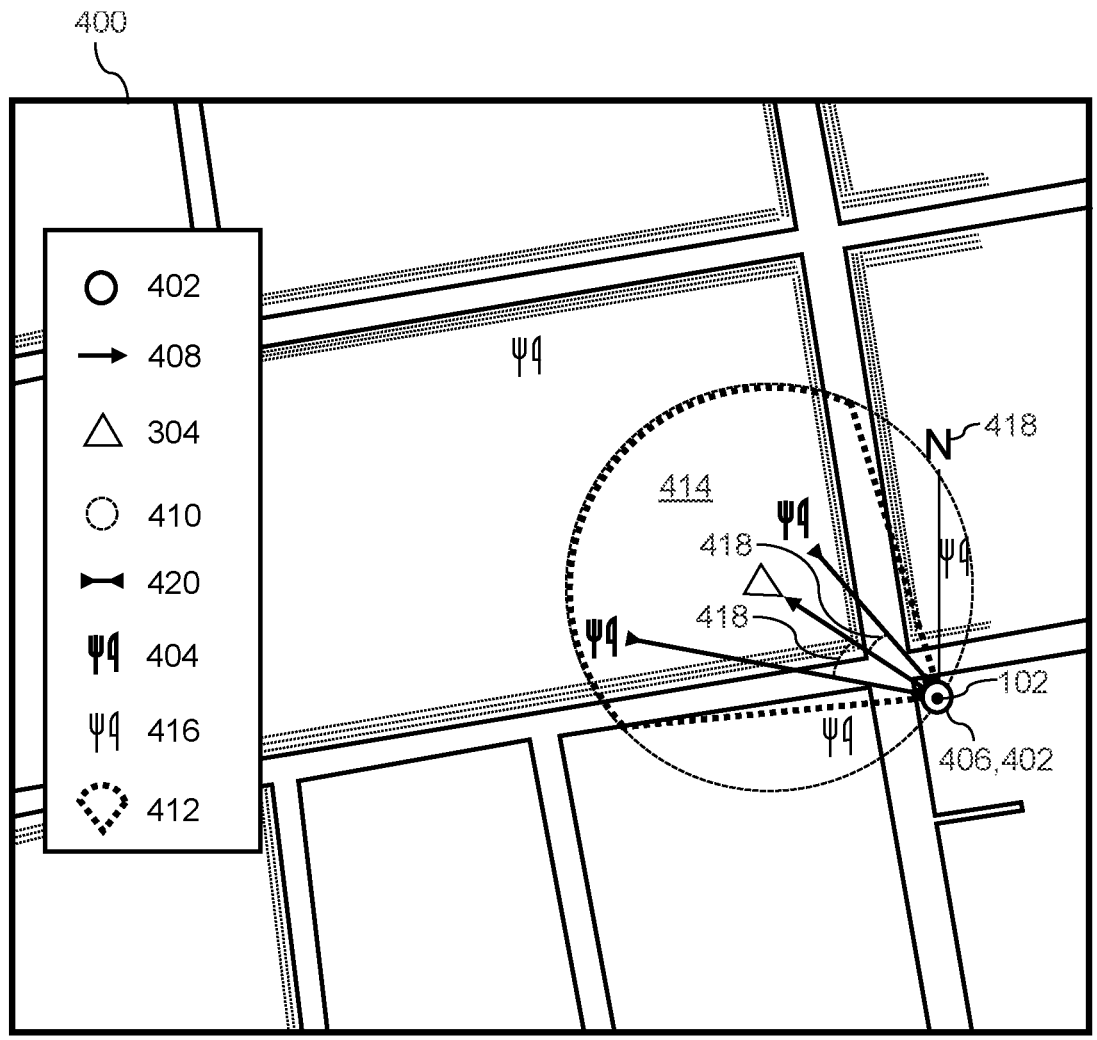
FIG. 4 depicts an example search area within a geographic area proximate to a physical location of a user according to example embodiments of the present disclosure.

Referring now to FIG. 4, a geographic area 400 proximate to a physical location 402 of the user 102 is depicted according to example embodiments of the present disclosure. It should be understood that example aspects of the present disclosure are discussed with reference to a wearable computing device 100 for purposes of illustration and discussion, and those having ordinary skill in the art, using the disclosures provided herein, will understand that example aspects of the present disclosure may be implemented with any suitable computing device of the computing system without deviating from the scope of the present disclosure.

After detecting the user gesture 302 (FIG. 3) from the user 102, data associated with one or more POIs 404 (including the particular POI 304) proximate to the physical location 402 of the user 102 may be obtained. More particularly, responsive to detecting the pointing gesture 302 (FIG. 3), the physical location 402 of the user 102 may be determined. For instance, in some examples, the navigational positioning system 218 (FIG. 2) of the wearable computing device 100 may generate user location data of the user 102 upon detecting the user gesture 302 (FIG. 3) by the user 102. The user location data may be processed and, based at least in part on the user location data, geographic coordinates corresponding to the physical location 402 of the user 102 may be determined.

A virtual reference point 406 may be determined based at least in part on the geographic coordinates corresponding to the physical location 402 of the user 102. In some examples, such as that depicted in FIG. 4, the virtual reference point 406 may correspond to the physical location 402 of the user 102. In other examples, however, the virtual reference point 406 may be a location proximate to the physical location 402 of the user 102. The virtual reference point 406 may serve as a reference point for the POI search operations. For instance, the virtual reference point 406 may be used to establish a pointing direction vector (PDV) 408. The PDV 408 may correspond to a direction of the user gesture 302 (FIG. 3). In other words, the PDV 408 may correspond to a direction in which the user 102 performed the user gesture 302 (FIG. 3) (e.g., a direction in which the user 102 pointed). In some examples, responsive to determining the physical location 402 of the user 102 and the PDV 408 of the user gesture 302, a haptic notification may be provided to the user 102 by a haptic device (not shown) of the wearable computing device 100 to indicate that the computing system has obtained enough information to identify the particular POI 304 at which the user gesture 302 is directed.

After the physical location 402 of the user 102 is determined, data associated with the one or more POIs 404 (including the particular POI 304) in the geographic area 400 proximate to the physical location 402 of the user 102 may be retrieved. More particularly, as noted above, the virtual reference point 406 may serve as a reference point for the POI search operations described herein. For instance, based at least in part on the virtual reference point 406, a search radius 410 in the geographic area 400 may be determined. Furthermore, based on the direction of the PDV 408, a search angle 412 in the search radius 410 may be determined. The search radius 410 and the search angle 412 together define a search area 414 within the geographic area 400 proximate to the physical location 402 of the user 102.

Once the search area 414 (e.g., search radius 410 and search angle 412) is determined, the one or more POIs 404 (including the particular POI 304) within the search area 414 may be identified. For instance, as shown, the one or more POIs 404 within the search area 414 may be distinguished between one or more POIs 416 that are outside of the search area 414, as indicated by POIs 404 being in bold and POIs 416 not being in bold in FIG. 4.

Responsive to identifying the one or more POIs 404 (including the particular POI 304) within the search area 414, data associated with the one or more POIs 404 (including the particular POI 304) may be retrieved. As will be discussed in greater detail below, the retrieved data may include, by way of non-limiting example, geographic coordinates for the one or more POIs 404, names of the one or more POIs 404, user ratings associated with service(s) provided at the one or more POIs 404, operating hours of venue(s) associated with the one or more POIs 404, contact information for entities associated with the one or more POIs 404, directions to the one or more POIs 404 from the physical location 402 of the user 102, and the like.

To determine which of the one or more POIs 404 at which the user gesture 302 (FIG. 3) is directed, a normalized bearing 418 relative to the PDV 408 may be determined for each of the one or more POIs 404 within the search area 414, including the particular POI 304. It should be noted that, for ease of illustration and discussion, a normalized bearing for the particular POI 304 is not depicted in FIG. 4 due to its overlap with the PDV 408. A distance 420 of the user 102 from each of the one or more POIs 404 within the search area, including the particular POI 304, may then be determined based at least in part on the virtual reference point 406. The particular POI 304 at which the user gesture 302 (FIG. 3) is directed may then be determined based at least in part on the normalized bearing 418 for each of the one or more POIs 404 within the search area 414 and the distance 420 of the user 102 from each of the one or more POIs 404 within the search area 414. For instance, as shown in the example depicted in FIG. 4, the user 102 is closer to the particular POI 304 than the other POIs 404 within the search area 414. Furthermore, the normalized bearing 418 for each of the other POIs 404 within the search area 414 is greater than the normalized bearing (not shown) for the particular POI 304. Thus, it may be determined that the user gesture 302 (FIG. 3) is directed to the particular POI 304 and not the other POIs 404 in the search area 414.

More particularly, in some examples, the particular POI 304 may be the POI having the smallest normalized bearing 418 relative to the PDV 408. Additionally and/or alternatively, in some examples, the particular POI 304 may be the POI that is the shortest distance from the physical location 402 of the user 102. Additionally and/or alternatively, in some examples, the particular POI 304 may be the POI that is the shortest walking distance from the physical location 402 of the user 102. Additionally and/or alternatively, in some examples, the particular POI 304 may be determined based on individual user preferences set by the user 102 and/or based on prior searches (e.g., search history) of the user 102. In this manner, the particular POI 304 at which the user gesture 302 (FIG. 3) is directed may be differentiated from the other POIs 404 within the search area 414.

In some examples, the user gesture 302 (FIG. 3) may be directed to a location having more than one POI located therein. For instance, by way of non-limiting example, the user gesture 302 (FIG. 3) may be directed to a multi-story building that includes the particular POI 304 on the ground floor and a different POI 502 on a floor above the particular POI 304. In such examples, computing systems according to the present disclosure may differentiate between the POIs on different floors of the same multi-story building to identify the particular POI 304 in the same manner as discussed above. In other words, after processing sensor data from the plurality of sensors 210 (FIG. 2), the computing system may determine, based on the sensor data, that the user gesture 302 (FIG. 3) is directed to the particular POI 304 on the ground floor instead of the POI 502 on the floor above the particular POI 304.

Figure 5:
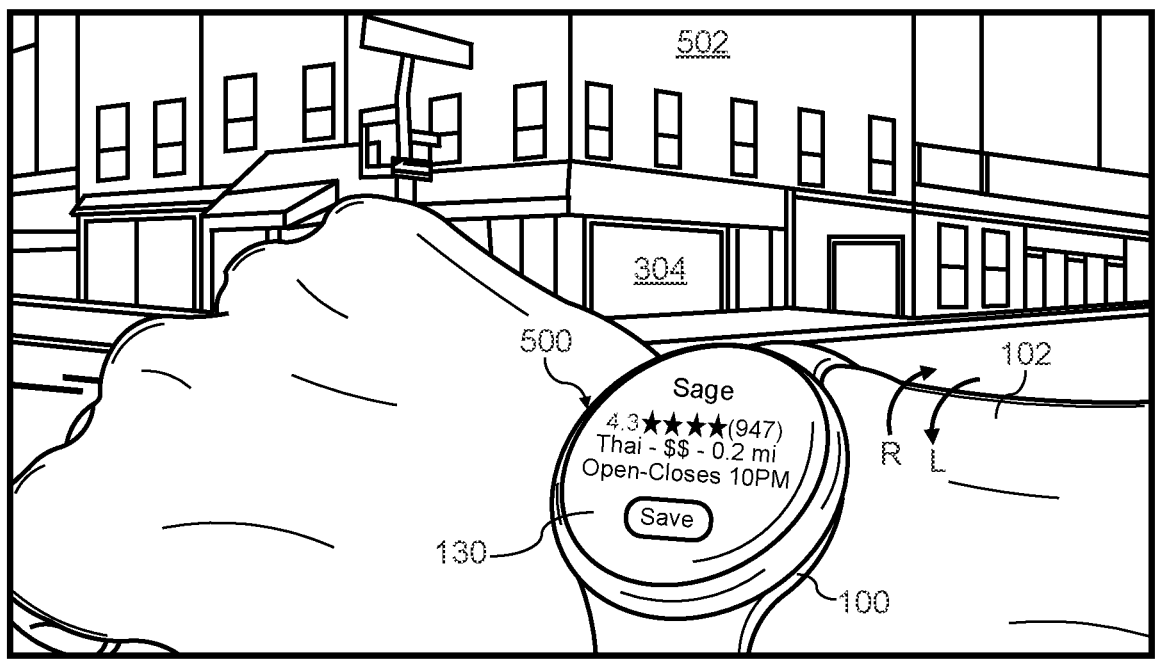
FIG. 5 depicts example display information according to example embodiments of the present disclosure.

After the particular POI 304 is determined, the data associated with the particular POI 304 may be surfaced for display to the user 102. As an illustrative example, referring now to FIG. 5, example display information 500 is depicted according to example embodiments of the present disclosure. It should be understood that example aspects of the present disclosure are discussed with reference to a wearable computing device 100 for purposes of illustration and discussion, and those having ordinary skill in the art, using the disclosures provided herein, will understand that example aspects of the present disclosure may be implemented with any suitable computing device of the computing system without deviating from the scope of the present disclosure.

More particularly, responsive to determining that the user gesture 302 (FIG. 3) is directed to the particular POI 304, a haptic notification may be provided to the user 102 by the haptic device (not shown) of the wearable computing device 100 to indicate that the computing system has identified the particular POI 304. Responsive to providing the haptic notification to the user 102, the display information 500 for presentation to the user 102 may be generated. The display information 500 may, in some examples, correspond to the data associated with the particular POI 304. By way of non-limiting example, as noted above, the display information 500 may include geographic coordinates for the particular POI 304, a name of the particular POI 304, user ratings associated with service(s) provided at the particular POI 304, operating hours of venue(s) associated with the particular POI 304, contact information for entities associated with the particular POI 304, directions to the particular POI 304 from the physical location 402 of the user 102, and the like.

In some examples, the display information 500 may be presented to the user via the display 130 of the wearable computing device 100. In other examples, the display information 500 may be presented to the user via a display of a different computing device, such as another mobile computing device of the computing system.

In some examples, after the display information 500 corresponding to the particular POI 304 is surfaced to the user 102, the user 102 may perform a second user gesture (that is different from the pointing gesture) to see display information associated with other POIs (e.g., POIs 404). More particularly, as noted above, a processor of the wearable computing device 100 (or computing system 700 (FIG. 7)) may be operable to differentiate between a variety of user gestures, such as the pointing gesture and a rotating gesture, based at least in part on the sensor data receive from the plurality of sensors 210 (FIG. 2). For instance, by way of non-limiting example, the user 102 may rotate their wrist (or swipe on display 130) in a right direction R and/or a left direction L. In response to detecting such gestures, the wearable computing device 100 may display information (similar to display information 500) that corresponds to other POIs in the environment 300 surrounding the user 102 (e.g., POIs 404).

Figure 6:
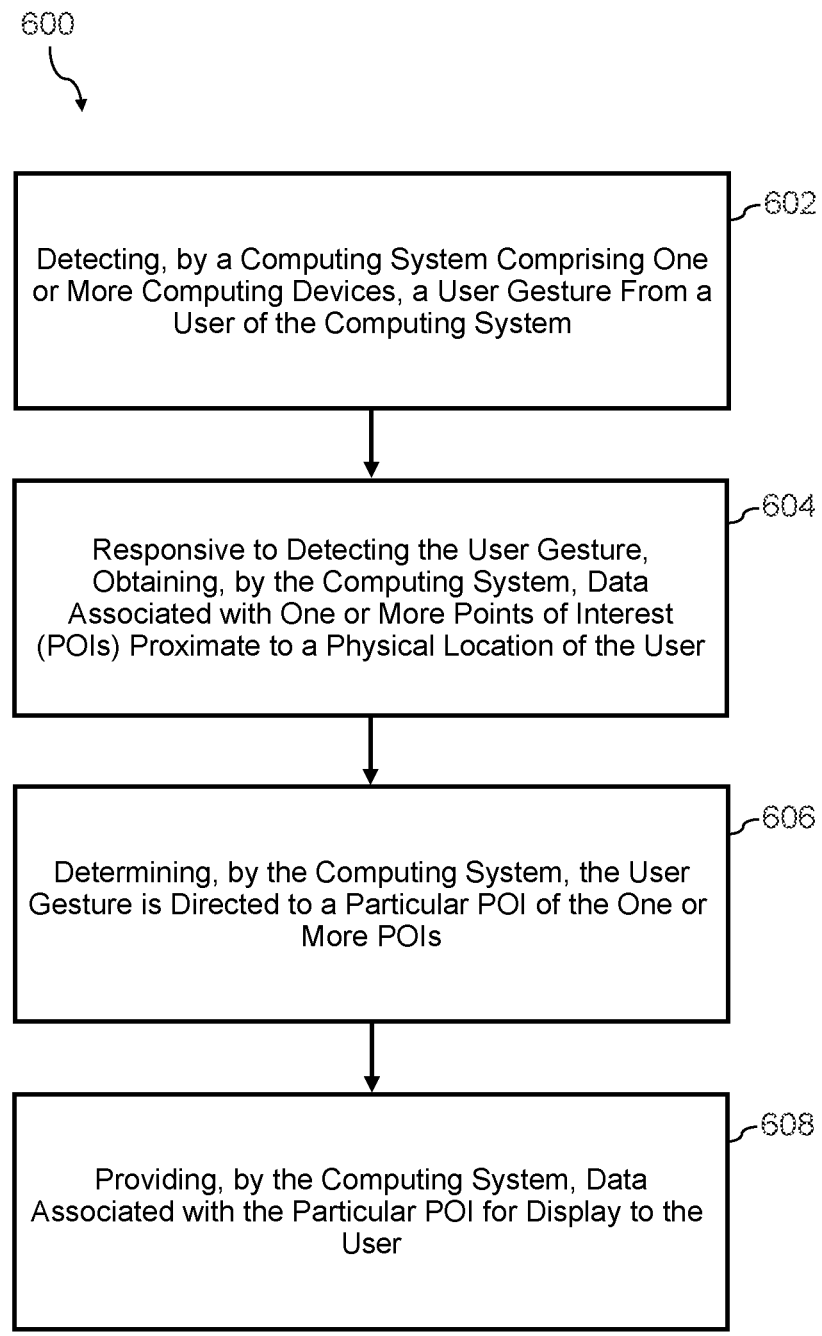
FIG. 6 depicts a flow chart diagram of an example method according to example embodiments of the present disclosure.

Referring now to FIG. 6, a flow diagram of an example computer-implemented method 600 is provided according to example embodiments of the present disclosure. The method 600 may be implemented using, for instance, a computing system (e.g., computing system 700 (FIG. 7)) that includes one or more computing devices, such as the wearable computing device 100 discussed above with reference to FIGS. 1A-5. Alternatively, the method 600 may be implemented by another computing device (e.g., server, smartphone, etc.) in the computing system that is communicatively coupled to the wearable computing device 100. It should be understood that, in some embodiments, some steps of the method 600 may be implemented locally on the wearable computing device 100, whereas other steps of the method 600 may be implemented by a computing device that is remote from the wearable computing device 100 and is communicatively coupled to the wearable computing device 100 via one or more wireless networks. FIG. 6 depicts steps performed in a particular order for purposes of illustration and discussion. Those of ordinary skill in the art, using the disclosures provided herein, will understand that various steps of any of the methods described herein can be omitted, expanded, performed simultaneously, rearranged, and/or modified in various ways without deviating from the scope of the present disclosure. Furthermore, various steps (not illustrated) can be performed without deviating from the scope of the present disclosure.

At (602), the method 600 may include detecting, by a computing system comprising one or more computing devices, a user gesture from a user of the computing system. More particularly, as will be discussed in greater detail below, a computing system (e.g., computing system 700 (FIG. 7)) may include one or more computing devices (e.g., wearable computing device 100, mobile computing device 710 (FIG. 7), remote computing system 730 (FIG. 7)) and may be configured to detect a variety of gestures from a user of the computing system, such as a pointing gesture by a user wearing the wearable computing device 100. For instance, as discussed above (FIG. 3), to detect the user gesture at (602), the computing system may process sensor data generated by an inertial measurement unit (IMU) of the computing system, such as the IMU 212 of the wearable computing device 100, and may determine that the user gesture is a pointing gesture based at least in part on the sensor data generated by the IMU 212.

At (604), the method 600 may include, responsive to detecting the user gesture, obtaining, by the computing system, data associated with one or more points of interest (POIs) proximate to a physical location of the user. More particularly, in response to detecting the user gesture by the user at (602), the computing system may determine a physical location of the user from which the user performed the user gesture. For instance, as discussed above (FIG. 4), to determine the physical location of the user, the computing system may process user location data generated by a navigation positioning system of the computing system, such as the navigation positioning system 218 of the wearable computing device 100. The computing system may then determine geographic coordinates corresponding to the physical location of the user based at least in part on the user location data generated by the navigation positioning system 218. The computing system may then determine a virtual reference point based at least in part on the geographic coordinates corresponding to the physical location of the user. The computing system may then determine a pointing direction vector of the user gesture detected at (602) based at least in part on the virtual reference point.

In some examples, the computing system may provide a haptic notification to the user after determining the physical location of the user and the pointing direction vector of the user gesture detected at (602). More particularly, a computing device of the computing system (e.g., wearable computing device 100) may include a haptic device (e.g., output device) and may provide a haptic notification via the haptic device in response to determining the physical location of the user and/or determining the pointing direction vector of the user gesture. In such examples, the haptic notification may indicate that the computing system has obtained enough information to determine the particular POI at which the user gesture detected at (602) is directed.

Furthermore, responsive to determining the physical location of the user, the computing system may retrieve data associated with one or more POIs in a geographic area proximate to the physical location of the user who performed the user gesture. For instance, as discussed above (FIG. 4), the computing system may determine a search radius in the geographic area based at least in part on the virtual reference point. The computing system may then determine a search angle in the search radius based at least in part on a direction of the pointing direction vector. As noted above, the determined search angle and search radius may define a search area within the geographic area proximate to the physical location of the user. The computing system may then identify the one or more POIs within the search area and, responsive to identifying the one or more POIs within the search area, may retrieve data associated with the one or more POIs within the search area.

At (606), the method 600 may include determining, by the computing system, the user gesture is directed to a particular POI of the one or more POIs. More particularly, as discussed above (FIG. 4), to determine the particular POI at which the user gesture is pointed at (606), the computing system may determine a normalized bearing relative to the pointing direction vector for each of the one or more POIs within the search area. The computing system may then determine a distance of the user from each of the one or more POIs within the search area based at least in part on the virtual reference point. The computing system may then determine the user gesture detected at (602) is directed to the particular POI of the one or more POIs based at least in part on the normalized bearing for each of the one or more POIs within the search area and the distance of the user from each of the one or more POIs within the search area. For instance, in some examples, the particular POI is a POI of the one or more POIs within the search area having a smallest normalized bearing relative to the pointing direction vector. Additionally and/or alternatively, in some examples, the particular POI is a POI of the one or more POIs within the search area having a shortest distance (e.g., closest) from the physical location of the user. Additionally and/or alternatively, in some examples, the shortest distance may be the shortest walking distance from the physical location of the user to the particular POI. Additionally and/or alternatively, in some examples, the particular POI may be determined based on individual user preferences set by the user and/or based on prior searches (e.g., search history) of the user.

At (608), the method 600 may include providing, by the computing system, data associated with the particular POI for display to the user. More particularly, as discussed above (FIGS. 3-5), a computing device of the computing system, such as the wearable computing device 100, may provide another haptic notification to the user via a haptic device (e.g., via output device 222) of the computing device in response to determining that the user gesture is directed to the particular POI. The haptic notification may indicate that the computing system has identified the particular POI at which the user gesture was directed. Responsive to providing the haptic notification to the user, the computing system may generate display information for presentation to the user. As noted above, the display information may correspond to the data associated with the particular POI that was obtained at (604). The computing system may then cause the computing device to present the display information to the user (e.g., display data to the user). For instance, the computing system may cause the wearable computing device 100 to display (e.g., via display 130) a variety of information relating to the particular POI at which the user gesture was directed. More particularly, by way of non-limiting example, the display information may include geographic coordinates of the particular POI, a name of the particular POI, user ratings associated with a service provided at the particular POI, operating hours of a venue associated with the particular POI, contact information of an entity associated with the particular POI, or directions to the particular POI from the physical location of the user.

In some examples, the user gesture detected at (602) may be a first user gesture and the particular POI determined at (606) may be a first POI. In such examples, subsequent to causing the computing device to present the display information associated with the first POI to the user at (608), the method 600 may further include detecting a second user gesture from the user that is different from the first user gesture detected at (602). By way of non-limiting example, the computing system may detect a second user gesture, such as a rotating gesture, from the user after providing the data associated with the first (particular) POI for display to the user. Responsive to detecting the second user gesture, the computing system may generate display information corresponding to data associated with a second POI of the one or more POIs that is different from the first (particular) POI. The computing system may then cause the computing device, such as the wearable computing device 100, to present the display information associated with the second POI to the user.

For instance, after being provided the display information at (608), the user may perform the second user gesture by rotating their wrist. It should be noted, however, that the second gesture may be any suitable user gesture different from the pointing gesture without deviating from the scope of the present disclosure. In response, the computing system may provide the data associated with other POIs to the user. In this manner, the user may see display information corresponding to all POIs in their environment using gestures.

Figure 7:
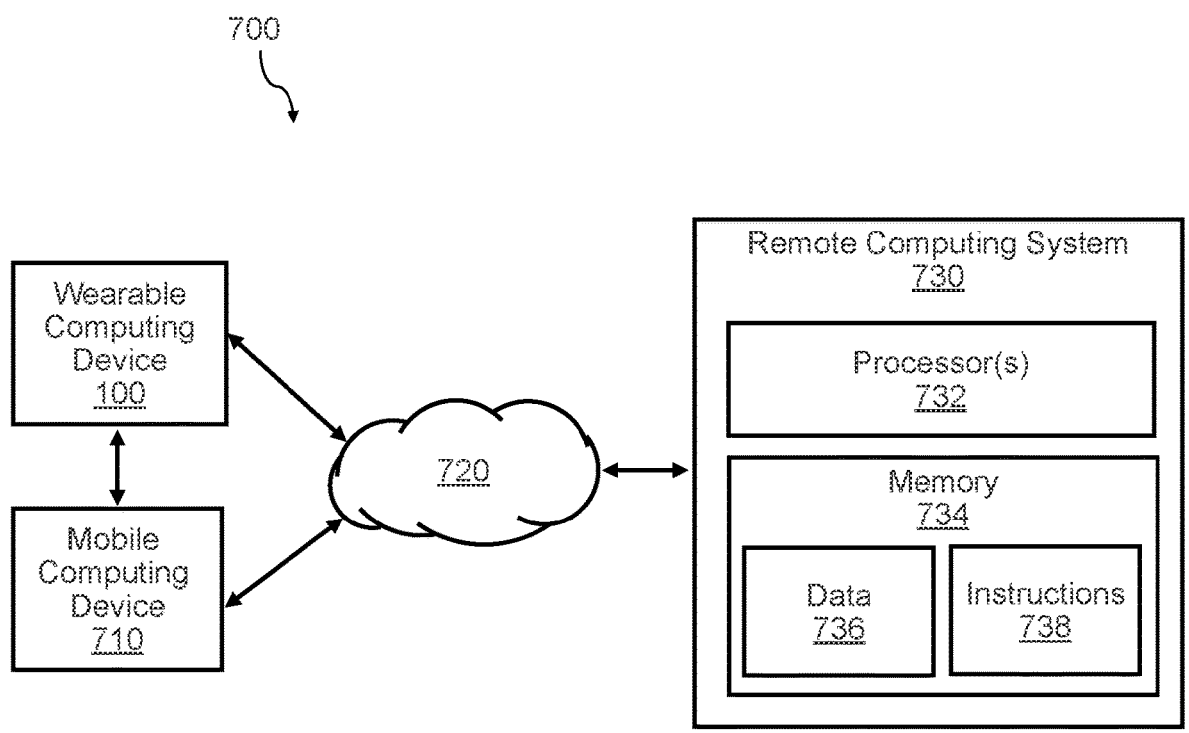
FIG. 7 depicts a computing system according to example embodiments of the present disclosure.

FIG. 7 depicts an example computing system 700 according to example embodiments of the present disclosure. In some examples, the computing system 700 may be used to implement the method 600 of FIG. 6 or other aspects of any of the methods described herein. The computing system 700 includes the wearable computing device 100 discussed above with reference to FIGS. 1-6 and a remote computing system 730. The wearable computing device 100 may be communicatively coupled to the remote computing system 730 over a network 720.

In some embodiments, the wearable computing device 100 may communicate the data to mobile computing device 710. In such embodiments, the wearable computing device 100 may communicate the data to the mobile computing device 710 and then the mobile computing device 710 may communicate the data over the network 720 to the remote computing system 730. In alternative embodiments, the wearable computing device 100 may bypass the mobile computing device 710 and instead communicate the data directly to the remote computing system 730 via the network 720. Furthermore, the mobile computing device 710 may include similar components to the wearable computing device 100 discussed above with reference to FIG. 2. In this way, the mobile computing device 710 may be capable of performing the same operations discussed herein with respect to the wearable computing device 100.

The remote computing system 730 includes one or more processors 732 and a memory 734. The one or more processors 732 may be any suitable processing device (e.g., a processor core, a microprocessor, an ASIC, an FPGA, a controller, a microcontroller, etc.) and may be one processor or a plurality of processors that are operatively connected. The memory 734 may include one or more non-transitory computer-readable storage medium(s), such as RAM, ROM, EEPROM, EPROM, flash memory devices, magnetic disks, etc., and combinations thereof. The memory 734 may store data 736 and instructions 738 which are executed by the processor 732 to cause the remote computing system 730 to perform operations, such as any of the operations described herein. For instance, in some examples, the data obtained from the one or more sensors 210 (e.g., IMU 212, navigational positioning system 218, biometric sensor 220, etc.) onboard the wearable computing device 100 may be communicated to the remote computing system 730 over network 720. Similarly, in some examples, the data associated with the one or more POIs may be stored at the remote computing system 730 and communicated to the wearable computing device 100 and/or the mobile computing device 710 via the network 720. In this manner, the computing system 700 may be operable to implement any of the methods described herein.

In some embodiments, the remote computing system 730 includes or is otherwise implemented by one or more computing devices. In instances in which the remote computing system 730 includes plural server computing devices, such server computing devices may operate according to sequential computing architectures, parallel computing architectures, or some combination thereof.

The network 720 may be any type of communications network, such as a local area network (e.g., intranet), wide area network (e.g., Internet), or some combination thereof and may include any number of wired or wireless links. In general, communication over the network 720 may be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The technology discussed herein refers to sensors and other computer-based systems, as well as actions taken, and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, the method comprising:
    detecting, by a computing system comprising one or more computing devices, a user gesture from a user of the computing system based at least in part on sensor data generated by an inertial measurement unit (IMU) of the computing system, the user gesture being a pointing gesture;
    responsive to detecting the user gesture, processing, by the computing system, user location data generated by a navigation positioning system of the computing system;
    determining, by the computing system, geographic coordinates corresponding to a physical location of the user based at least in part on the user location data generated by the navigation positioning system;
    determining, by the computing system, a virtual reference point based at least in part on the geographic coordinates corresponding to the physical location of the user;
    determining, by the computing system, a pointing direction vector of the user gesture based at least in part on the virtual reference point;
    determining, by the computing system, a search radius in a geographic area based at least in part on the virtual reference point, the geographic area being proximate the physical location of the user;
    determining, by the computing system, a search angle in the search radius based at least in part on a direction of the pointing direction vector, the search angle and the search radius defining a search area within the geographic area;
    identifying, by the computing system, one or more points of interest (POIs) within the search area;
    responsive to identifying the one or more POIs within the search area, retrieving, by the computing system, data associated with the one or more POIs within the search area;
    determining, by the computing system, a normalized bearing relative to the pointing direction vector for each of the one or more POIs within the search area;
    determining, by the computing system, a distance of the user from each of the one or more POIs within the search area based at least in part on the virtual reference point;
    determining, by the computing system, the user gesture is directed to a particular POI of the one or more POIs based at least in part on the normalized bearing for each of the one or more POIs within the search area and the distance of the user from each of the one or more POIs within the search area; and
    providing, by the computing system, data associated with the particular POI for display to the user.

2. The method of claim 1, wherein detecting the user gesture comprises:
    processing, by the computing system, the sensor data generated by the IMU of the computing system; and
    determining, by the computing system, the user gesture is the pointing gesture based at least in part on the sensor data generated by the IMU.

3. The method of claim 1, wherein the particular POI is a POI of the one or more POIs within the search area having a smallest normalized bearing relative to the pointing direction vector and a shortest distance from the physical location of the user.

4. The method of claim 3, wherein the shortest distance is a shortest walking distance from the physical location of the user to the particular POI.

5. The method of claim 1, wherein providing the data associated with the particular POI for display to the user comprises:
    providing, by a computing device of the computing system, a haptic notification to the user via a haptic device of the computing device, the haptic notification indicating that the computing system has identified the particular POI;
    responsive to providing the haptic notification to the user, generating, by the computing system, display information for presentation to the user, the display information corresponding to the data associated with the particular POI; and
    causing, by the computing system, the computing device to present the display information to the user.

6. The method of claim 5, wherein the display information comprises geographic coordinates of the particular POI, a name of the particular POI, user ratings associated with a service provided at the particular POI, operating hours of a venue associated with the particular POI, contact information of an entity associated with the particular POI, or directions to the particular POI from the physical location of the user.

7. The method of claim 5, wherein the user gesture is a first user gesture and the particular POI is a first POI, the method further comprising:
    subsequent to causing the computing device to present the display information associated with the first POI to the user, detecting, by the computing system, a second user gesture from the user, the second user gesture being different from the first user gesture;
    responsive to detecting the second user gesture, generating, by the computing system, display information corresponding to data associated with a second POI of the one or more POIs, the second POI being different from the first POI; and causing, by the computing system, the computing device to present the display information associated with the second POI to the user.

8. A computing system, comprising:
one or more computing devices comprising one or more processors; and
one or more non-transitory computer readable media that collectively store instructions that, when executed by the one or more processors, cause the computing system to perform operations, the operations comprising:
detecting a user gesture from a user of the computing system based at least in part on sensor data generated by an inertial measurement unit (IMU) of the computing system, the user gesture being a pointing gesture;
responsive to detecting the user gesture, determining geographic coordinates corresponding to a physical location of the user based at least in part on user location data generated by a navigation positioning system of the computing system;
determining a virtual reference point based at least in part on the geographic coordinates corresponding to the physical location of the user;
determining a pointing direction vector of the user gesture based at least in part on the virtual reference point;
determining a search radius in a geographic area based at least in part on the virtual reference point, the geographic area being proximate the physical location of the user;
determining a search angle in the search radius based at least in part on a direction of the pointing direction vector, the search angle and the search radius defining a search area within the geographic area;
identifying one or more points of interest (POIs) within the search area;
responsive to identifying the one or more POIs within the search area, retrieving data associated with the one or more POIs within the search area;
determining a normalized bearing relative to the pointing direction vector for each of the one or more POIs within the search area;
determining a distance of the user from each of the one or more POIs within the search area based at least in part on the virtual reference point;
determining the user gesture is directed to a particular POI of the one or more POIs based at least in part on the normalized bearing for each of the one or more POIs within the search area and the distance of the user from each of the one or more POIs within the search area; and
providing data associated with the particular POI for display to the user.

9. The computing system of claim 8, wherein the operation of detecting the user gesture comprises:
processing the sensor data generated by the IMU of the computing system; and
determining the user gesture is the pointing gesture based at least in part on the sensor data generated by the IMU.

10. The computing system of claim 8, wherein the operation of providing the data associated with the particular POI for display to the user comprises:
providing a haptic notification to the user via a haptic device of a computing device of the one or more computing devices, the haptic notification indicating that the computing system has identified the particular POI;
responsive to providing the haptic notification to the user, generating display information for presentation to the user, the display information corresponding to the data associated with the particular POI; and
causing the computing device to present the display information to the user.

11. A computing device, comprising:
a display;
a navigation positioning system;
an inertial measurement unit (IMU); and
one or more processors configured to:
detect a user gesture from a user of the computing device based at least in part on sensor data generated by the IMU, the user gesture being a pointing gesture;
responsive to detecting the user gesture, determine geographic coordinates corresponding to a physical location of the user based at least in part on user location data generated by the navigation positioning system;
determine a virtual reference point based at least in part on the geographic coordinates corresponding to the physical location of the user;
determine a pointing direction vector of the user gesture based at least in part on the virtual reference point;
determine a search radius in a geographic area based at least in part on the virtual reference point, the geographic area being proximate the physical location of the user;
determine a search angle in the search radius based at least in part on a direction of the pointing direction vector, the search angle and the search radius defining a search area within the geographic area;
identify one or more points of interest (POIs) within the search area;
responsive to identifying the one or more POIs within the search area, retrieve data associated with the one or more POIs within the search area;
determine a normalized bearing relative to the pointing direction vector for each of the one or more POIs within the search area;
determine a distance of the user from each of the one or more POIs within the search area based at least in part on the virtual reference point;
determine the user gesture is directed to a particular POI of the one or more POIs based at least in part on the normalized bearing for each of the one or more POIs within the search area and the distance of the user from each of the one or more POIs within the search area; and
cause the display to display data associated with the particular POI.

12. The computing device of claim 11, wherein the IMU is a steady IMU comprising one or more accelerometers and one or more gyroscopes.

13. The computing device of claim 11, wherein the computing device is one of a wearable computing device or a mobile computing device.

* * * * *